(12) United States Patent
Bhat (10) Patent No.: US 12,279,155 B2
(45) Date of Patent: Apr. 15, 2025

(54) METHOD FOR DATA PACKET TRANSFERRING BASED ON PACKET LOSS PREDICTION

(71) Applicant: Telefonaktiebolaget LM Ericsson (PUBL), Stockholm (SE)

(72) Inventor: Harish Venkatraman Bhat, Hjärup (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 442 days.

(21) Appl. No.: 17/776,149

(22) PCT Filed: Nov. 13, 2019

(86) PCT No.: PCT/SE2019/051149
§ 371 (c)(1),
(2) Date: May 11, 2022

(87) PCT Pub. No.: WO2021/096401
PCT Pub. Date: May 20, 2021

(65) Prior Publication Data
US 2022/0400404 A1 Dec. 15, 2022

(51) Int. Cl.
*H04W 28/04* (2009.01)
*H04B 7/0408* (2017.01)
(Continued)

(52) U.S. Cl.
CPC .......... *H04W 28/04* (2013.01); *H04B 7/0408* (2013.01); *H04W 28/0268* (2013.01); *H04W 28/065* (2013.01)

(58) Field of Classification Search
CPC ............. H04W 28/04; H04W 28/0268; H04W 26/065; H04B 7/0408
See application file for complete search history.

(56) References Cited

U.S. PATENT DOCUMENTS

| 10,367,568 B1 | 6/2019 | Nammi et al. |
| 2003/0103461 A1* | 6/2003 | Jorgenson ............... H04L 41/16 370/244 |

(Continued)

FOREIGN PATENT DOCUMENTS

WO 2019 112497 A1 6/2019

OTHER PUBLICATIONS

Alireza Ameli Renani et al., IEEE Infocom 2017—IEEE Conference on Computer Communications, "Harnessing Hardware Defects for Improving Wireless Link Performance: Measurements and Applications" (Year: 2017).*

(Continued)

*Primary Examiner* — Joseph A Bednash
(74) *Attorney, Agent, or Firm* — Baker Botts L.L.P.

(57) ABSTRACT

A baseband processing unit (BPU) and method therein for segmenting data to be transferred into data packets and transferring data packets to a radio processing unit via a communication link. The BPU selects a certain amount of data among the data to be transferred and obtain a packet loss pattern of the communication link based on the current load and user scenario. The BPU segments the data to be transferred into data packets based on the packet loss pattern of the communication link such that the selected data are distributed to data packets to be transferred in a packet (Continued)

region where packet loss rate is lower than a packet loss threshold and transfers the data packets to the radio processing unit.

15 Claims, 9 Drawing Sheets

(51) Int. Cl.
   *H04W 28/02* (2009.01)
   *H04W 28/06* (2009.01)

(56) References Cited

U.S. PATENT DOCUMENTS

| | | | |
|---|---|---|---|
| 2013/0294419 A1 | 11/2013 | Heiser et al. | |
| 2014/0056245 A1* | 2/2014 | Qin | H04W 72/21 370/329 |
| 2017/0244648 A1 | 8/2017 | Tse | |
| 2017/0288751 A1* | 10/2017 | Faxér | H04B 7/0626 |
| 2018/0176898 A1 | 6/2018 | Yu et al. | |
| 2019/0007246 A1 | 1/2019 | Fertonani et al. | |
| 2019/0199379 A1 | 6/2019 | Osterling et al. | |
| 2019/0289470 A1* | 9/2019 | Vaidya | H04W 16/14 |
| 2019/0341985 A1 | 11/2019 | Chopra et al. | |

OTHER PUBLICATIONS

Koodli et al., "One-Way Loss Pattern Sample Metrics", IETF Network Working Group, RFC 3357, Aug. 2002 (Year: 2002).*

PCT Notification of Transmittal of the International Search Report and the Written Opinion of the International Searching Authority, or the Declaration issued for International application No. PCT/SE2019/051149—Nov. 24, 2020.

Alireza Ameli Renani et al., IEEE Infocom 2017—IEEE Conference on Computer Communications, "Harnessing Hardware Defects for Improving Wireless Link Performance: Measurements and Applications"—2017.

Yunkai Wei and Tracey Ho, Fifty-First Annual Allerton Conference, Allerton House, UIUC, Illinois, USA, "On Prioritized Coding for Real-Time Streaming Under Packet Erasures"—Oct. 2-3, 2013.

Extended European Search Report issued for Application No./Patent No. 19952166.7-1206 / 4059316 PCT/SE2019051149—Oct. 26, 2022.

* cited by examiner

| Load Situations | Number of packets N |
|---|---|
| 1 | 00110011001110…110 |
| 2 | 11001111100011 |
| 3 | 11000011100000…110 |
| 4 | 11110000111100….0001111 |
| … | … |
| SU | 1110001110001…110 |
| | |

Fig. 8

METHOD FOR DATA PACKET TRANSFERRING BASED ON PACKET LOSS PREDICTION

PRIORITY

This nonprovisional application is a U.S. National Stage Filing under 35 U.S.C. § 371 of International Patent Application Serial No. PCT/SE2019/051149 filed Nov. 13, 2019 and entitled "Method for Data Packet Transferring Based on Packet Loss Prediction" which is hereby incorporated by reference in its entirety.

TECHNICAL FIELD

Embodiments herein relate to a method for data packet transferring between two units via a communication link. In particular, the embodiments relate to segmenting data to be transferred to avoid losing important data.

BACKGROUND

The development of new generations of cellular systems simultaneously with upgrading existing generations allows for a wider range of radio access networks (RANs) and radio access technologies (RATs). Further, specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network.

The introduction of 5G network or new radio (NR) provides the possibility for a new set of services or use cases for the network operators. The diverse range of services together with demand for very low data packet latency and high data rates in some cases, introduces the need for having flexible and scalable radio network architecture. Lots of study and work is ongoing to achieve the functional split in the RAN for flexible and scalable deployment.

The flexible deployment requires division of network functions into multiple units, so that different units can be deployed in different hardware units, e.g. general purpose processor or a dedicated hardware. Within the RAN, the baseband processing is one of the most complex processing part and flexible deployment of RAN also require identifying the units within baseband that can be deployed in a flexible way.

Figure 1:
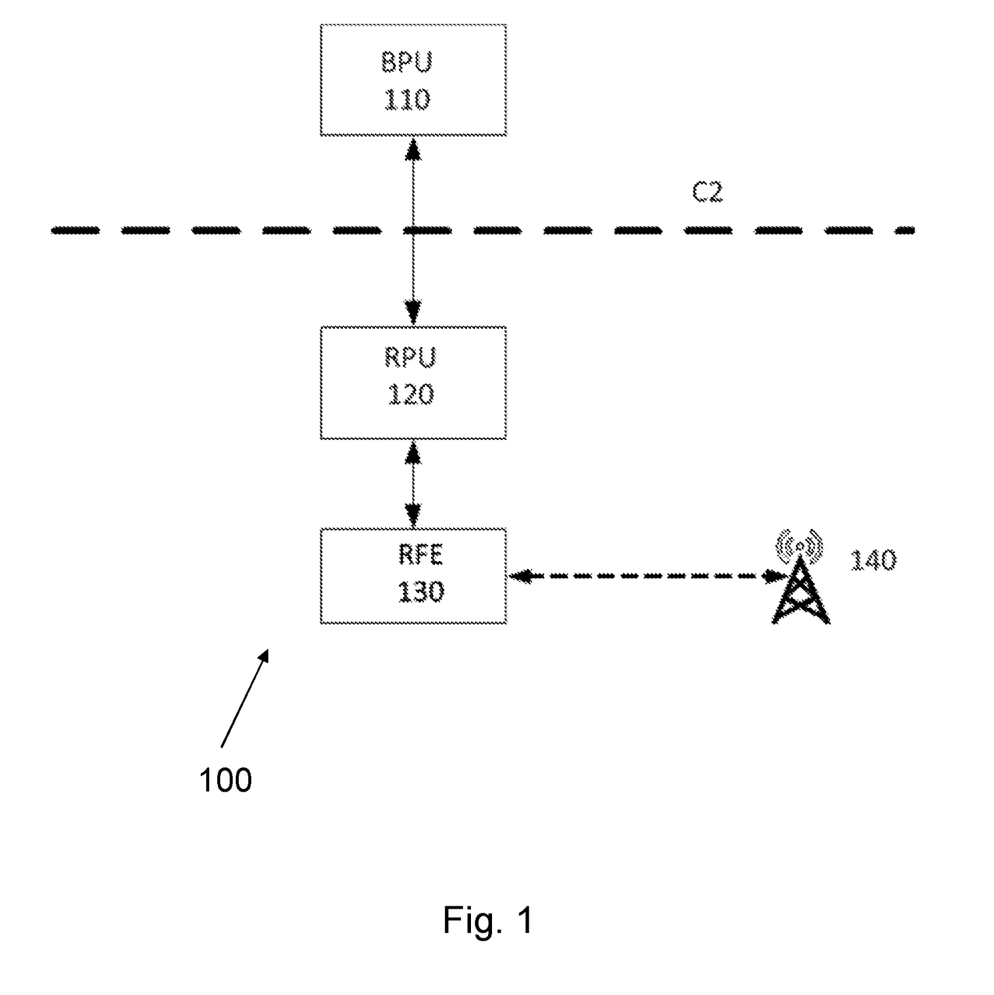
FIG. 1 is a block overview illustrating an example of a radio access network deployment with division of network functions into multiple units.

One of the flexible deployments that are being used is division of the baseband into two parts. FIG. 1 shows a deployment overview for the baseband processing in a network node 100.

The first part is Baseband Processing Unit, BPU 110. All the baseband functionalities that are intended for continuous growth and modifications may be put in this BPU. These functions are more susceptible for maintenance and hence can be in a hardware unit that is easy for maintenance, easily accessible and easy for trouble shooting. Some functionalities that may be put in BPU 110 are:
  Massive multi-input-multi-output (MIMO) scheduling;
  Channel state processing, e.g. weight calculation for beamforming;
  Upper physical layer processing.

The second part is Radio Processing Unit, RPU 120. All the functions, such as lower physical layer processing, beamforming functions etc., which are of long-term nature and that need very less maintenance are put in RPU 120. RPU 120 is connected to a Radio Front End FRE 130. The main idea is to keep RPU 120 close to an antenna tower or radio tower 140 in customer site.

With the above-mentioned baseband functionality division, the RPU 120 forms the lower level physical layer baseband processing and the BPU 110 forms the upper level physical layer baseband processing.

Other criteria for the partition may be the computational resource availability in BPU 110 or RPU 120. This means if for example, RPU 120 is heavily loaded and there is a shortage of computational resource available, then in this case some of the computations may be moved from RPU 120 to BPU 110.

The BPU 110 and RPU 120 are placed separately and the distance between them may be different for different deployment. Hence there is a need to connect them with a very good communication link. The mostly used communication link is the Ethernet link. This link is called as C2 link.

The main problem with the Ethernet link is its capacity limitations. The amount of data that flow between BPU 110 to RPU 120 is very heavy. From the downlink perspective, following are the main data that flow from BPU 110 to RPU 120:
  Encoded data from the upper physical layer in BPU 110 to lower physical layer in RPU 120;
  Beam forming weights from BPU 110 to RPU 120.

Figure 2:
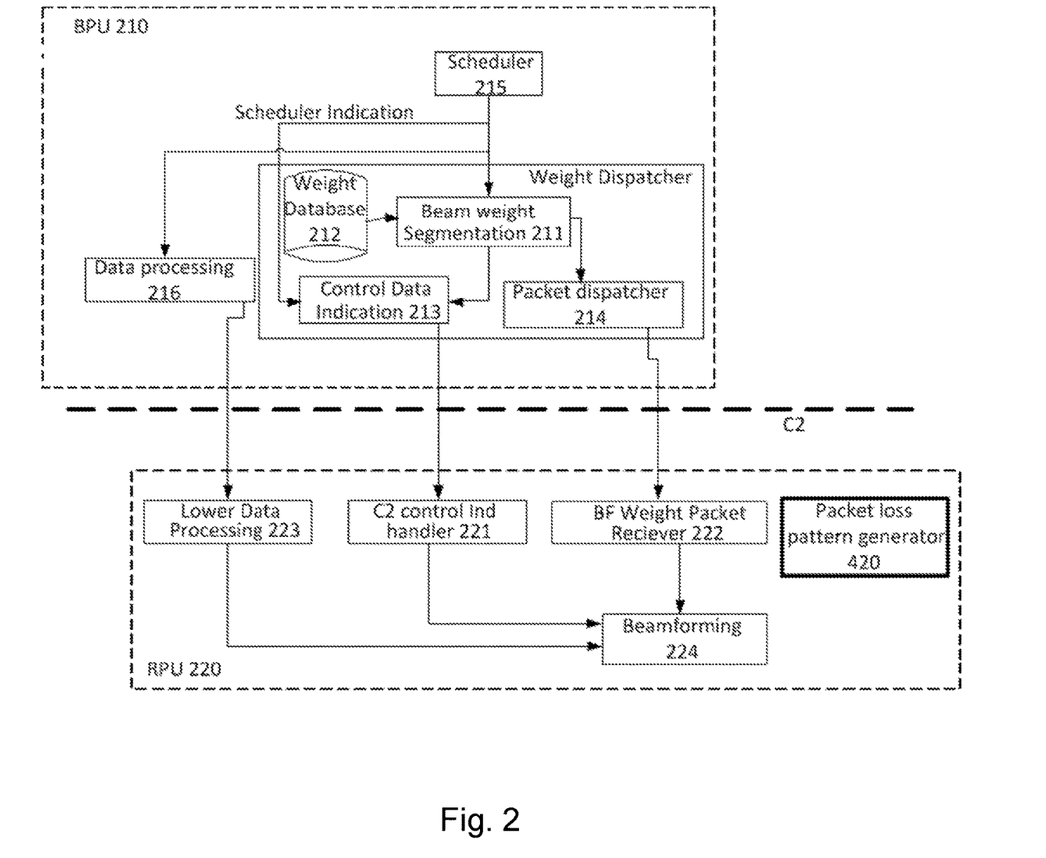
FIG. 2 is a block diagram illustrating function blocks for baseband processing in a radio access network according to prior art.

FIG. 2 shows an overview of an existing solution for transferring beamforming weights from BPU to RPU. The existing solution has the software deployed in BPU 210 and RPU 220. BPU 210 and RPU 220 are connected through C2 Ethernet link interface.

BPU 210 comprises a weight dispatcher part, it comprises the following parts:
  Beam Weight Segmentation 211: The Ethernet packet has a limitation on number of bytes that can be put in a single Ethernet packet. Beam weight segmentation 211 fetches the beamforming (BF) weights from weight database 212 for each layer, e.g. single user (SU) or multi user (MU) and divides the BF weights into multiple segments such that each segment does not exceed the Ethernet data packet size.
  Control Data Indication 213: Control data indication 213 includes the information on the total number of segments for each layer, e.g. SU or MU, among the other control information needed for the RPU 220. Followings are key parameters which are of interest for this application among other parameters:
    Total number of layers;
    Layer Information;
    Layer index;
    Total number of segments for the layer.
  Packet dispatcher 214: Packet dispatcher 214 dispatches the Ethernet data packet to RPU 220 starting from the first segment to the last segment. Apart from the actual BF weights, each segment has the following control information:
    Segmentation Index
    Layer Index
    List of Beam Ids in this segment.
Other processing parts in BPU 210 shown in FIG. 2 are:
  Scheduler 215: Responsible for allocating frequency resource for UEs;
  Data processing 216: Upper physical layer processing, e.g. data encoding.

The RPU 220 part handles the lower physical layer processing, beamforming and radio function processing. Followings are the main components that are of interesting from this application point of view:

Control Indication Handler 221: Receives the control part of the Ethernet packet from the control data indication 213. One of the main parameters is the total number of segment for each layer, e.g. SU or MU.

BF Weight Packet Receiver 222: Receives the Ethernet packet data from the packet dispatcher 214.

Data Processing 223: Lower physical layer data processing, such as modulation mapping, layer mapping etc.

Beamforming 224: Combines beam weights from BF Weight Packet Receiver 222 with the data from Data Processing 223 to complete the beamforming of the user data.

The packets sent across the Ethernet connection may be lost. This means that the Ethernet packets from BPU to RPU are not fully reliable since important data may be lost.

SUMMARY

It is therefore an object of embodiments herein to provide an improved method for data packet transferring between two units via a communication link to avoid losing important data.

According to a first aspect of embodiments herein, the object is achieved by a method performed in a baseband processing unit (BPU) for segmenting data to be transferred into data packets and transferring data packets to a radio processing unit via a communication link. The BPU selects a certain amount of data among the data to be transferred and obtain a packet loss pattern of the communication link based on the current load and user scenario. The BPU segments the data to be transferred into data packets based on the packet loss pattern of the communication link such that the selected data are distributed to data packets to be transferred in a packet region where packet loss rate is lower than a packet loss threshold and transfers the data packets to the radio processing unit.

According to a second aspect of embodiments herein, the object is achieved by a baseband processing unit (BPU) for segmenting data to be transferred into data packets and transferring data packets to a radio processing unit via a communication link. The BPU is configured to select a certain amount of data among the data to be transferred and obtain a packet loss pattern of the communication link based on the current load and user scenario. The BPU is further configured to segment the data to be transferred into data packets based on the packet loss pattern of the communication link such that the selected data are distributed to data packets to be transferred in a packet region where packet loss rate is lower than a threshold and transfer the data packets to the radio processing unit.

By segmenting data, i.e. user data or beamforming weight data, to be transferred based on the packet loss pattern of the communication link, the important data are distributed to data packets to be transferred in a packet region with relatively less likely packet loss. In this way, beamforming weights data for different major beams are distributed to different data packets so losing important data is avoided. SU and MU MIMO performance and beamforming performance are improved due to reduced number of packet loss for all major beams. Similarly, user data with higher requirement on quality of service may also be distributed to different data packets to avoid data losing and thereby improved user experience.

Therefore, the embodiments herein provide an improved method for data packet transferring between two units via a communication link.

BRIEF DESCRIPTION OF THE DRAWINGS

Examples of embodiments herein are described in more detail with reference to attached drawings in which:

FIGS. 6 (a) and (b) are flowcharts depicting one embodiment of a method for segmenting data and transferring data packets via a communication link according to the embodiments herein;

FIGS. 7 (a), (b) and (c) are examples of packet loss pattern; and

DETAILED DESCRIPTION

As part of developing embodiments herein, problems related to the existing solution as shown in FIG. 2 for transferring beamforming weights from BPU to RPU will first be analyzed and described.

Figure 3:
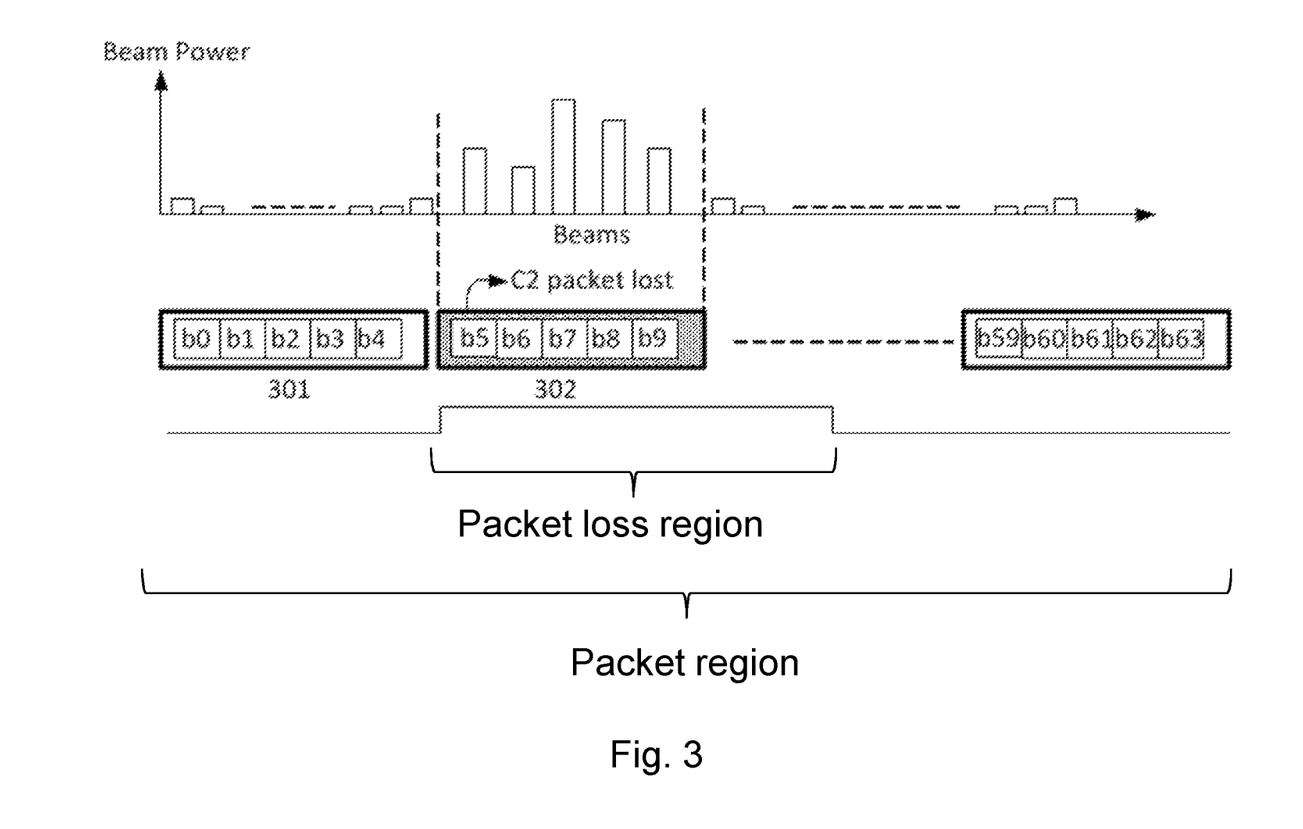
FIG. 3 is a schematic diagram showing packet creation and example of packet loss.

The packets sent across the Ethernet connection may be lost. FIG. 3 shows an example of packet creation and an example of packet loss. As shown in FIG. 3, an Ethernet packet may contain BF weights for many beams, e.g. packet 301 contains 5 beams b0, b1, b2, b3 . . . b4, packet 302 contains 5 beams b5, b6, b7, b8 . . . b9, etc. If a C2 packet is lost, e.g. packet 302 is lost, then it is possible that weights for the beams with good power are lost since the lost C2 packet 302 has the major beams with good power e.g. b5, b7, b8, b9 in it. This means that the Ethernet packet from BPU to RPU is not fully reliable. If good beams are lost, then in the RPU the beamforming quality will be impacted. This will have a significant impact on the throughput due to bad beamforming. A reason to cause this problem is that when forming a C2 packet with the existing solution, there is no logic to selection of beams within a C2 packet based on C2 characteristics.

To solve the problem, according to embodiments herein, the C2 characteristics e.g. Ethernet packet loss pattern is predicted or obtained, then the Ethernet packet loss pattern is used to achieve intelligent BF weight segmentation or packetization so that BF weights for all the beams with good power are not put in the same packet. The packets containing the BF weights for the good beams are transmitted from BPU to RPU so that they avoid the possible packet loss region. A packet region is herein defined as an interval of time during which packets are transmitting from DU to RU. A packet loss region is an interval of time or a group of packet sequences during which there is a high risk of packet loss. The high risk of packet loss means that the number of lost packets exceeds a threshold, for example 50%, or the packet loss rate is higher than a threshold, for example 0.5. The packet loss rate is defined as a ratio of the number of lost packets to the total number of the packets transferred.

Figure 4:
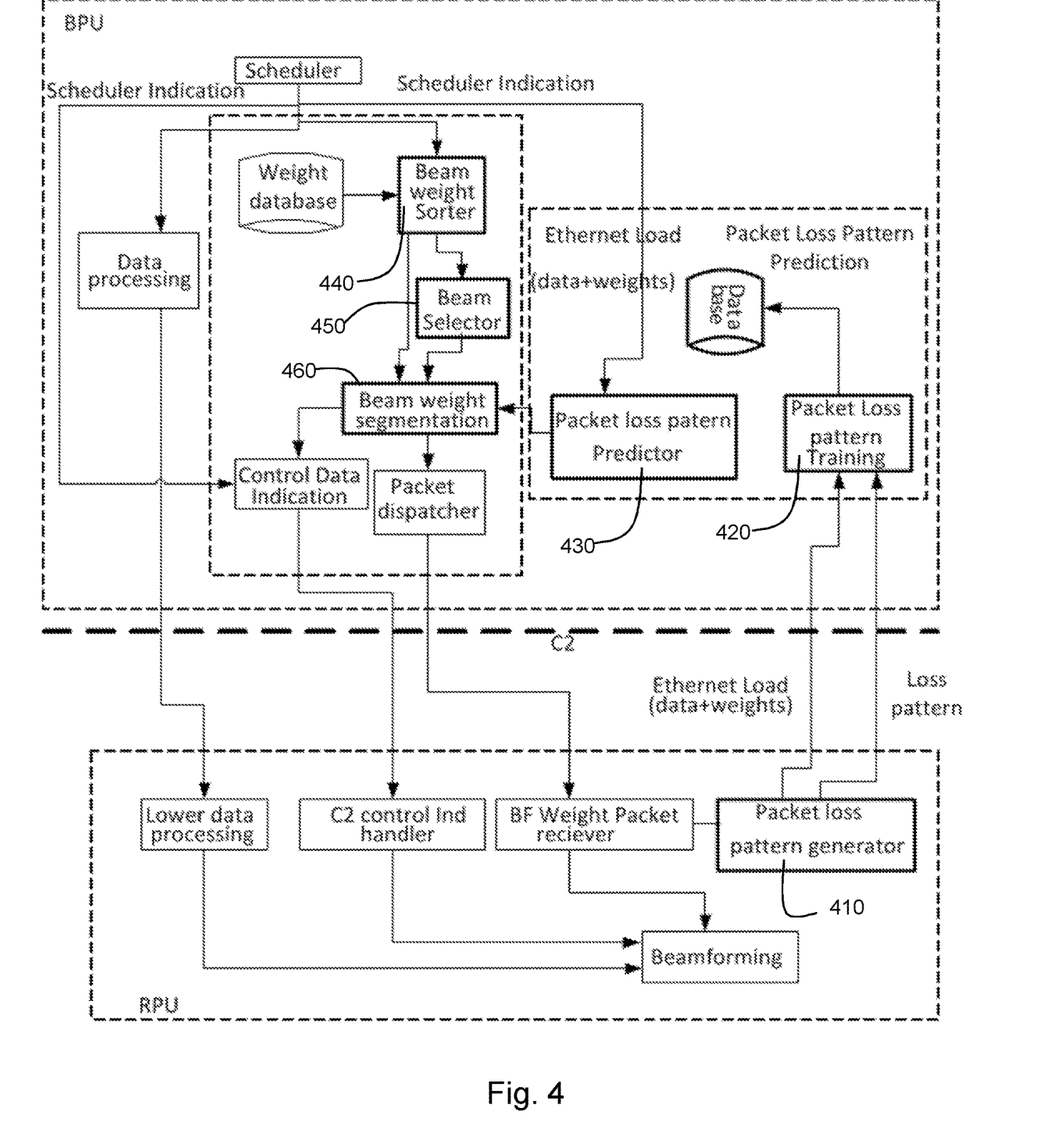
FIG. 4 is a block diagram illustrating function blocks for baseband processing in a radio access network according to the embodiments herein.

FIG. 4 shows an overview of a solution according to the embodiments herein. The added function blocks are shown with thick outlines. The other function blocks are the same as the existing solution shown in FIG. 2.

As discussed above, packet loss may happen during the transfer of packets through the Ethernet. Apart from this packet loss, it is also possible that packet transfer takes more than the expected transfer time, for example due to high load. This will have an impact on the processing chain which processes the packets in RU. Due to high timing constraints in the physical layer processing chain, it is very important to have the strict deadline for different processing entities and strict time deadline for the starting time for such processing entities. If the packets transferred from DU to RU are delayed, the processing entities in RU cannot wait for such packets. Hence the packets arriving later than a deadline time Td are considered as lost since they are no more useful for the further processing.

The deadline time Td is a system parameter. This parameter may be measured in the lab with different load scenarios with the help of digital signal processing (DSP) cycle profiling of different processing entities in the RU. The Td for the BF weight processing in RU and the Td for the user data processing in RU may be different. After the measurement of a Td with respective profiling, this value is set as a constant and if a processing entity is expecting a data packet, BF weight data or user data packet, then these data packets should reach the processing entity before the respective set deadline Td.

According to some embodiments herein, a packet loss pattern generator 410 is introduced in RPU. As discussed above, a packet is termed as lost if the expected packet is not received at all or the expected packet is not received within a deadline time Td. The total number of packets to be received in a slot is given by a control signal from the Control Data Indication 213, and the packet identity (ID) for each packet is in the individual packet. Packet loss pattern generator 410 generates the loss pattern for each reception interval for a given load on C2.

According to some embodiments herein, a Packet loss pattern training model 420 is introduced in BPU.

The packet loss pattern training may be done with regression as shown in the equation below:

$$y = f(x, \beta) \quad (1)$$

Where y is packet loss pattern; x is the load for different user scenario Su, Mu on the Ethernet, i.e. data size and weight size; β is prediction coefficient.

Training data needed for this is mainly x, the load on the Ethernet, i.e. the total load size in bytes transmitted for a transfer period T, and y the packet loss pattern.

During the training period, a training sequence of y and x is used to train the model to find a function $f$ and coefficient β. Once trained with enough training sequences, the combination of function $f$ and β is able to predict a new packet loss pattern y' for a given new load x'. That is the model 420 is trained for packet loss pattern for a given load and user scenario. Once the model 420 is trained with enough training data, the model 420 can be used to predict the packet loss pattern and time of the packet loss region for a current load and user scenario.

According to some embodiments herein, a Packet loss pattern predictor 430 is introduced in BPU. The predictor 430 has the following inputs:

x' the current load and user scenario on the Ethernet link C2;

β the trained prediction coefficient for a given C2 load x. The equation for this may be given as below:

$$y' = f(x', \beta) \quad (2)$$

Where, y' is the predicted packet loss pattern.

The predictor 430 may be used for different user scenarios and different load for each user scenario. The predicated packet loss patterns may be stored for each of these use cases and used during segmentation.

According to some embodiments herein, a Beam weight sorter 440 is introduced in BPU. The beam sorter 440 sorts all beams for a given layer in power level order, e.g. from the highest power level to the lowest power level.

The beam power for a beam n and Physical Resource Group (PRG) k, with (a+jb) as the channel estimates, where a and b are beamforming weights, is calculated using following equation:

$$P_{n,k} = \sqrt{a^2 + b^2} \quad (3)$$

Where, n is the beam number, n=0, 1, .... A−1, where A is the number of antennas, k is the PRG number. PRG is the group of Physical Resource Blocks (PRBs) and each PRG has 2 PRBs. For 100 MHz NR, it has 273 PRBs and the number of PRG for this case is 137.

The wideband beam power is calculated as, $$P_n = \frac{\sum_{k=0}^{k=B-1} P_{n,k}}{B} \quad (4)$$

Where, n is the beam number, n=0, 1, .... A−1, where A is the number of antennas, k is the PRG number, B is the total number of PRGs.

The wideband beam power for a give layer, e.g. SU or MU may be sorted from the highest to the lowest.

According to some embodiments herein, a Beam selector 450 is introduced in BPU. The beam selector 450 selects major beams. The major beams are the beams with power exceeding a certain power threshold "$P_T$". One may select a number "N" of major beams that exceeds the power threshold $P_T$.

The power threshold $P_T$ and the number of major beams N to select are parameters which may be determined by simulations and may be configurable during operating.

According to the embodiments herein, after beam sorting and selecting, the beam weight segmentation 460 is updated to take into consideration the packet loss pattern. For example, If the packet loss pattern for a given C2 load suggests C2 packets "n" to "n+5" as possible packet loss region, then weight segmentation will not put major beams in those C2 packets, i.e. packets "n" to "n+5". That is the selected beams are distributed to different data packets of the communication link C2, where the beam weights associated with a relatively higher power level are distributed to packets in a packet region with relatively less likely packet loss.

Figure 5:
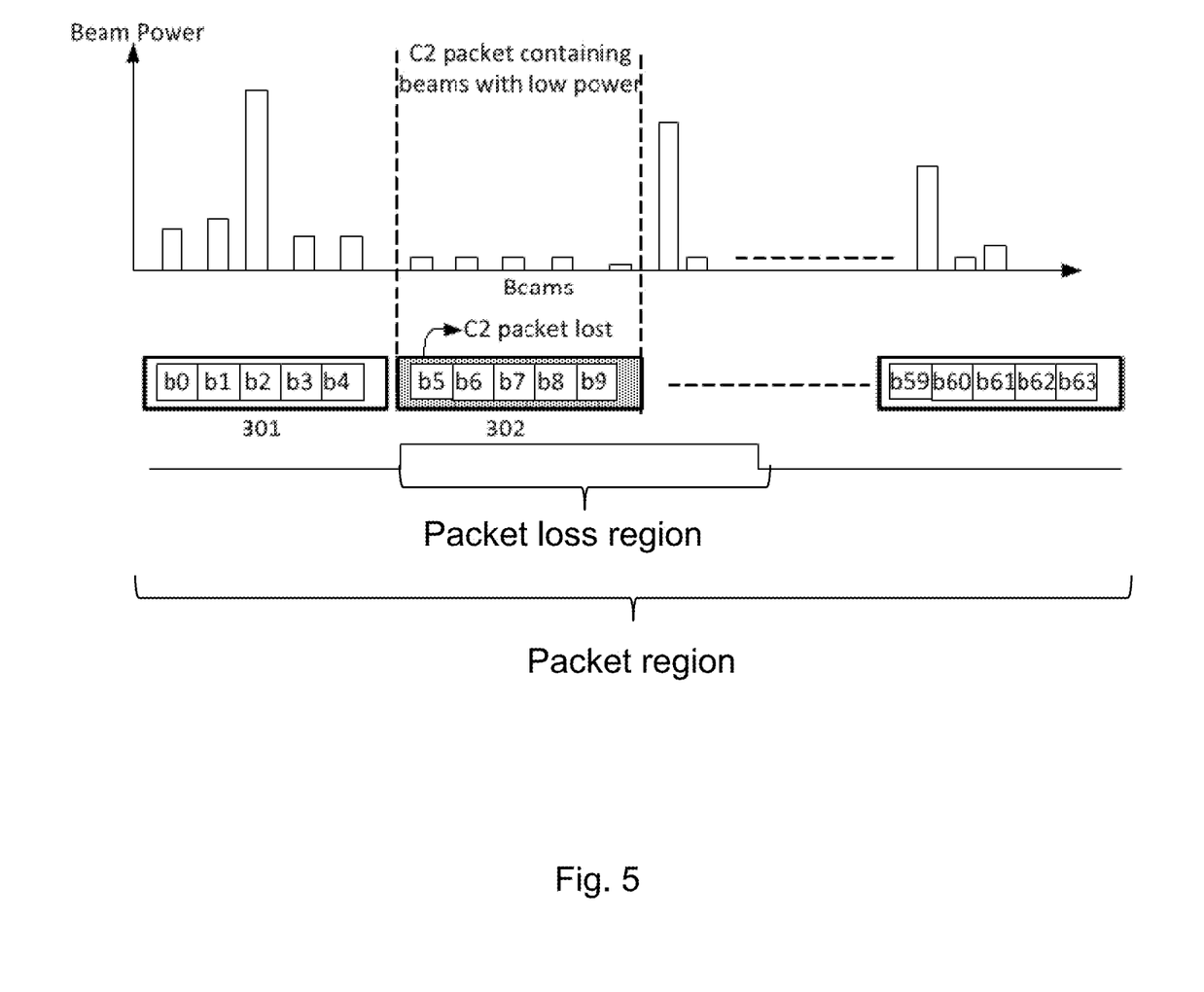
FIG. 5 is a schematic diagram illustrating packets creation based on packet loss pattern according to the embodiments herein.

An overview of the segmentation considering the packet loss pattern is shown in FIG. 5. As shown in FIG. 5, if C2 packet loss pattern is predicted before and BPU knows that packet 302 is in the packet loss region, then for example, beams b0, b1, b2, b3, b4 which are major beams with higher power will be put in the C2 data packet 301. Beams b5, b6, b7, b8, b9 have lower power and will be put in the C2 data packet 302 which is most likely lost when transfer from BPU to RPU.

Figure 6:
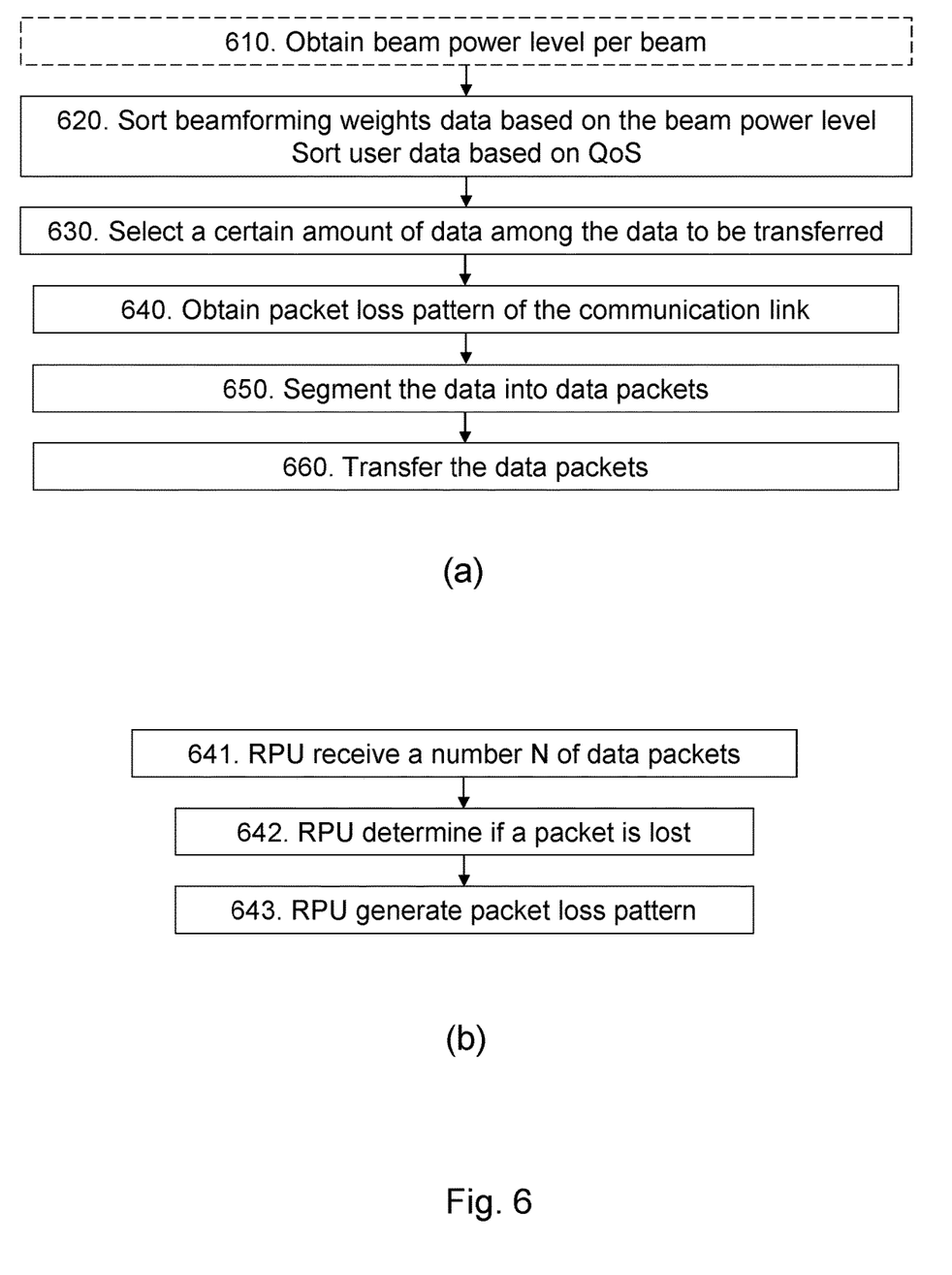

According to the embodiments herein, a method performed in a baseband processing unit (BPU) for segmenting data to be transferred into data packets and transferring data packets via a communication link to a radio processing unit (RPU) will be described with reference to FIG. 6 (a). The data to be transferred from BPU to RPU comprises payload data or user data and beamforming weights data. The method comprises the following actions which may be performed in any suitable order.

Action 610

In order to segment or divide the beamforming weights data, the BPU obtains beam power level per beam. The beam power level for each beam may be calculated using equations (3) and (4). Action 610 is optional and it is not needed when prioritizing the user data to be transferred.

Action 620

In order to prioritize the beamforming weights data to be transferred, the BPU sorts beamforming weights data based on the beam power level.

In order to prioritize the user data to be transferred, the BPU may alternatively sort user data based on quality of service (QoS) for each user equipment (UE). The user data may be sorted based on the QoS from the highest to the lowest.

Action 630

The BPU selects a certain amount of data among the data to be transferred. For beamforming weights data, the selection may be based on beam power level, e.g. the beamforming weights data associated with beam power level above a threshold $P_T$ are selected.

For user data, the selection may be based on the sorted data with QoS order.

Action 640

The BPU obtains a packet loss pattern of the communication link based on the current load and user scenario.

According to one embodiment, the BPU may choose a packet loss pattern from a packet loss pattern table based on the current load and user scenario. The packet loss pattern table comprises a list of packet loss patterns for the communication link with different load situations and different user scenarios. The table may be generated offline in a lab or simulation environment. The table may be updated at a preselected time intervals.

According to one embodiment, the BPU may predict a packet loss pattern based on a trained packet loss prediction coefficient β and the current load situation and user scenario of the communication link, as described above with reference to equation (2).

According to some embodiment, the BPU may machine train a packet loss pattern model to obtain a packet loss pattern prediction coefficient β based on packet loss patterns generated by a RPU and a database comprising different load situations and user scenarios of the communication link, as described above with reference to equation (1).

According to some embodiments herein, a method for generating a packet loss pattern for a communication link in a RPU is described with reference to FIG. 6 (b). The method may comprise the following actions:

Action 641

RPU receives from the BPU via the communication link a number N of data packets during a time period T.

Action 642

RPU determines that a packet is lost if an expected packet is not received within a predefined time limit Td.

Action 643

RPU generates a packet loss pattern for the communication link indicating positions of the lost packets either in time frame or in a sequence within the number N of data packets.

RPU may further generate a packet loss pattern table comprising a list of packet loss patterns for the communication link with different load situations and different user scenarios.

Figure 7:
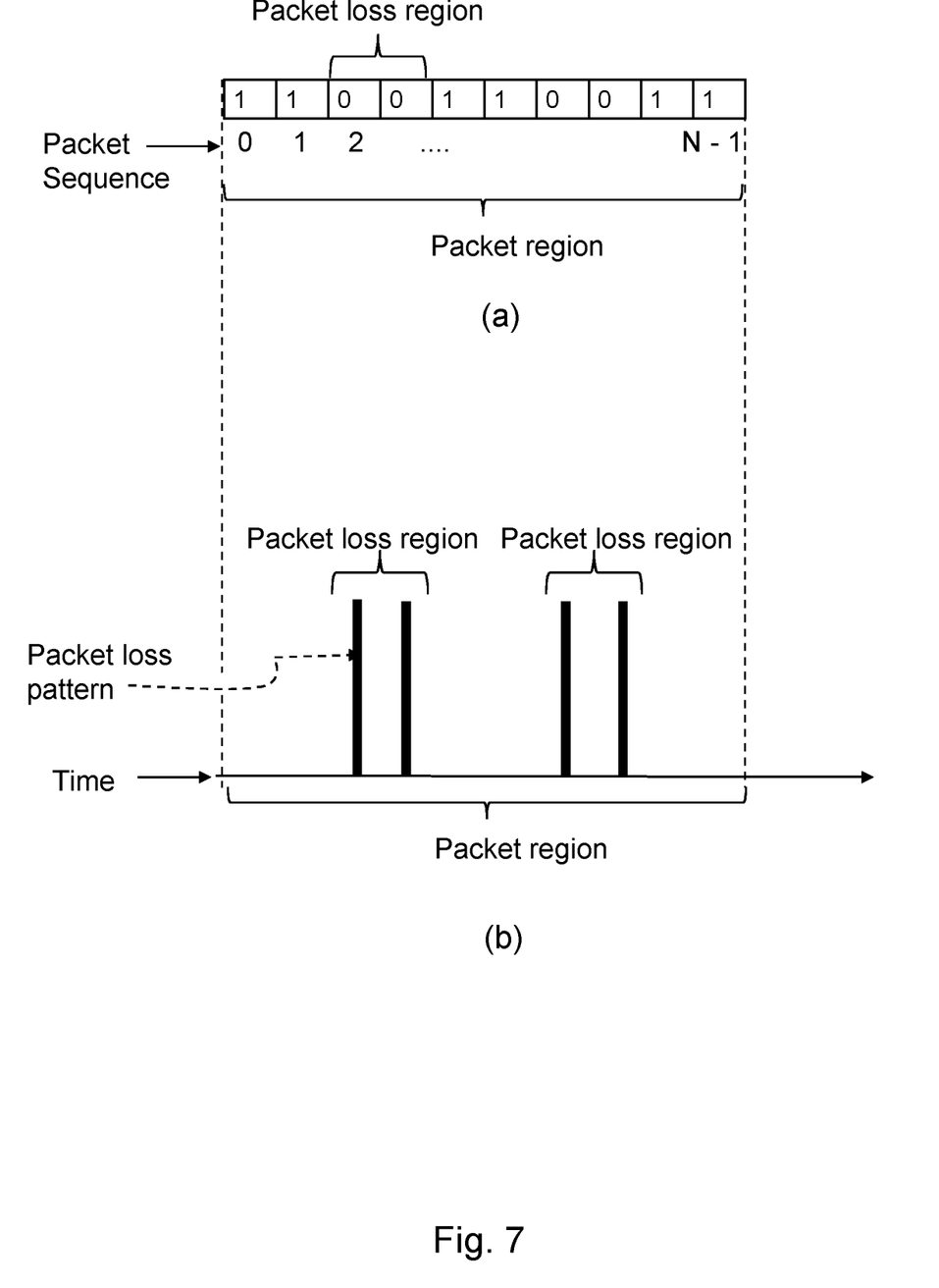

FIG. 7 shows examples of packet loss patterns for the communication link, where (a) is an example of a packet loss pattern represented in a sequence 0, 1, 2 . . . N−1 for the number N of data packets, where positions of the lost packets are indicated by a digital logic e.g. "0", (b) is an example of a packet loss pattern represented in time frame, where positions of the lost packets are indicated by a time stamp, and (c) is an example of a packet loss pattern table for the communication link with different load situations, i.e. different packet numbers N, and different user scenarios, i.e. MU, SU.

Action 650

The BPU segments the data to be transferred into data packets of the communication link based on the packet loss pattern. The segmentation may further be based on beam power level or quality of service (QoS) of the UEs depending on types of the data to be transferred.

As discussed in the background, the Ethernet packet has a limitation on number of bytes that can be put in a single Ethernet packet. The data to be transferred, e.g. the beamforming weights data and user data, needs to be divided into multiple segments such that each segment does not exceed the Ethernet data packet size. In this way, the data to be transferred are divided into data packets of the communication link. Each data packet may contain beamforming weights data for many beams.

The number of data packets N transmitted from BPU to RPU during a time period or a transmission slot depends on the user case, i.e. the size of data needs to be transferred. If each data packet in the communication link has 1560 bytes, the number of data packets is:

$$N = \frac{\text{Data Size}}{1560}$$

According to one embodiment, the BPU determines data packet segmentation for beamforming weights data based on the packet loss pattern of the communication link and beam power level such that the selected beamforming weights data are distributed to the data packets to be transferred in a packet region where the packet loss rate is lower than a threshold. That is the beamforming weights data associated with a relatively higher beam power level, i.e. the beam power level above a threshold $P_T$, are distributed to the data packets to be transferred in a packet region with relatively less likely packet loss, i.e. a packet region where the packet loss rate is lower than a threshold.

From the payload point of view, the payload data for UEs or user data with high requirement on quality of service (QoS) is more important. It should be avoided that the data packets with high QoS user data is sent within the packet loss regions. The scheduled UEs in a slot or subframe are listed in the QoS order. UEs with high QoS are listed at the top of the list and UEs with low QoS are at the bottom of the list. The user data may be sorted based on the QoS from high to low and selected based on the sorted data with QoS order. During Ethernet packet segmentation and transmission it should be ensured that the UEs with high QoS get the good packet transmission region with lower packet loss rate.

Therefore according to some embodiments herein, the BPU may segments the user data or payload data based on the packet loss pattern of the communication link and QoS of user data such that the selected user data are distributed to the data packets to be transferred in the packet regions with relatively lower possibility of packet loss, i.e. the packet regions where the packet loss rate is lower than a packet loss threshold, e.g. 10% or 0.1. The packet loss threshold is configurable and the value may be determined or selected based on simulation results.

The Ethernet interface between BPU and RPU is shared for both the user data and the BF weights data transfer. Hence it is proposed that the ethernet transmission ensures good packet transmission region for the user data starting from high QoS to low QoS, followed by the selected major beams and finally followed by the rest of beams, i.e. the minor beams, as shown in Table 1. This ensures that the lossy packet transmission region is allocated to the minor beams, thus protecting the user data and the BF weight data of the major beams from transmission loss.

TABLE 1

| Payload Type | Characteristics | Comments |
| --- | --- | --- |
| Data | QoS1 | QoS listed from high to low |
| Data | QoS2 | |
| ... | ... | |
| Data | QoSn | |
| BF Weight | Major Beams | Major beam region |
| BF Weight | Major beams | |
| BF Weight | Minor beams | Minor beam region |
| BF Weight | Minor beams | |

Therefore according to some embodiments herein, the BPU may sort the data to be transferred based on the QoS of the user data and the beam power level of the beamforming weights data such that the data to be transferred are listed in an order of the user data from higher QoS to lower QoS followed by the beamforming weights data from higher power level to lower power level. Then selecting a certain amount of data among the data to be transferred may comprise selecting a certain amount of the data from the sorted data list. The BPU may segment the data to be transferred based on the packet loss pattern of the communication link such that the selected data are distributed to the data packets to be transferred in the packet regions where the packet loss rate is lower than a threshold. Alternatively the BPU may segment the data to be transferred based on the packet loss pattern of the communication link such that the sorted data from the top to the bottom in the list are distributed to the data packets to be transferred in the packet regions with packet loss rate from lower to higher.

Action 660

After segmentation, all data to be transferred are distributed to the number of N data packets, the BPU then transfers the data packets to the RPU.

Figure 8:
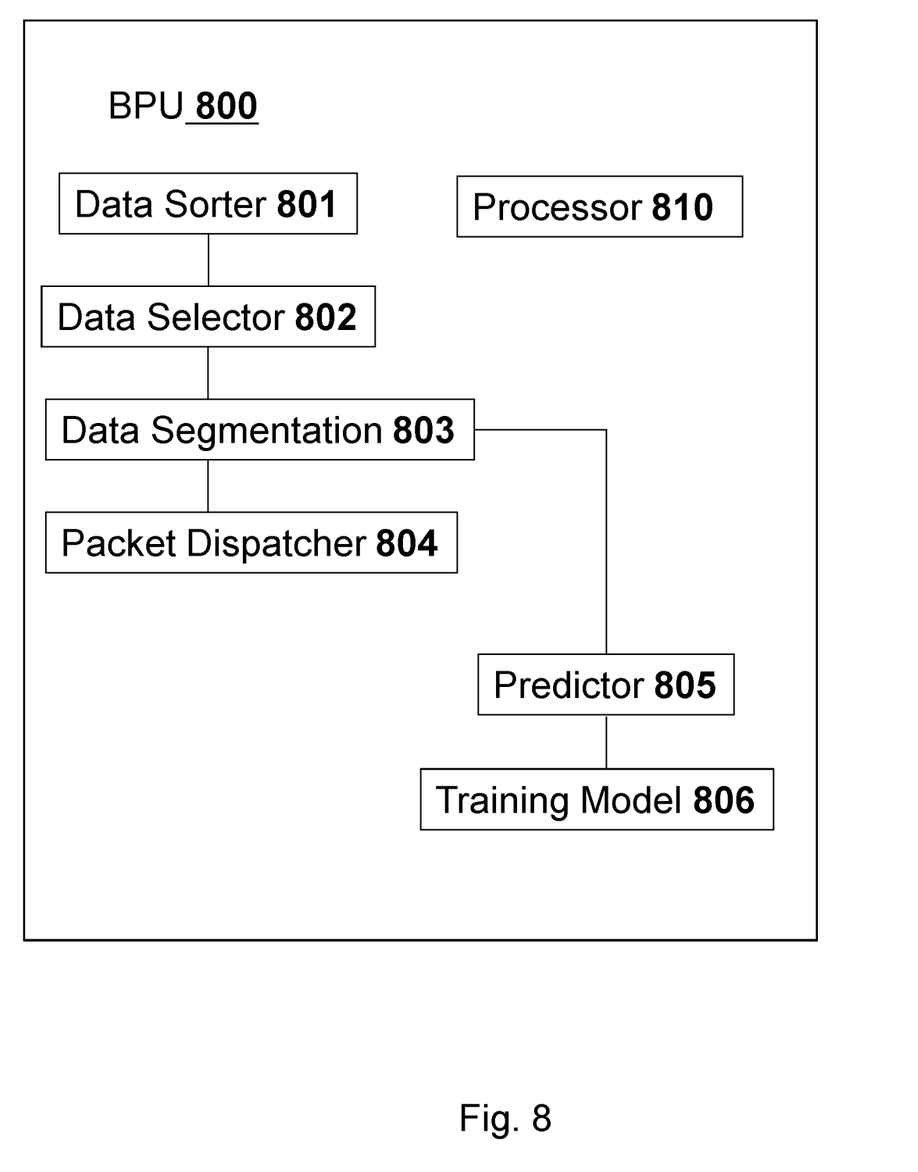
FIG. 8 is a block diagram illustrating function blocks of a BPU according to embodiments herein.

A BPU 800 to perform the method for segmenting data to be transferred into data packets and transferring data packets to a radio processing unit via a communication link will be described with reference to FIG. 8. The BPU 800 comprises function blocks such as a data sorter 801, a data selector 802, a data segmentation 803, a packet dispatcher 804. The BPU 800 may further comprise a predictor 805, a training model 806. The BPU 800 may further comprise other function blocks as shown in FIG. 4.

The BPU 800 is configured to, e.g. by means of the data selector 802 being configured to, select a certain amount of data among the data to be transferred.

The BPU 800 is further configured to, e.g. by means of the predictor 805 being configured to, obtain a packet loss pattern of the communication link based on the current load and user scenario.

The BPU 800 is further configured to, e.g. by means of the data segmentation 803 being configured to, segment the data to be transferred into data packets based on the packet loss pattern of the communication link such that the selected data are distributed to data packets to be transferred in a packet region where packet loss rate is lower than a packet loss threshold.

The BPU 800 is further configured to, e.g. by means of the packet dispatcher 804 being configured to, transfer the data packets to the radio processing unit.

The BPU 800 may be further configured to obtain power level per beam for beamforming weights data and sort the beamforming weights data based on beam power level.

The BPU 800 may be configured to select a certain amount of beamforming weights data based on beam power level.

The BPU 800 may further be configured to sort user data based on quality of service (QoS) of UEs.

The BPU 800 may be configured to select a certain amount of user data based on the QoS of the UEs.

The BPU 800 may further be configured to sort the data to be transferred based on QoS of user data and beam power level of beamforming weights data such that the data to be transferred are listed in an order of the user data from higher QoS to lower QoS followed by the beamforming weights data from higher power level to lower power level.

The BPU 800 may be configured to select a certain amount of data among the data to be transferred based on the sorted data list.

The BPU 800 may be configured to segment the data to be transferred based on the packet loss pattern of the communication link such that the sorted data from the top to the bottom in the list are distributed to the data packets to be transferred in the packet regions with packet loss rate from lower to higher.

The BPU 800 may be configured to obtain a packet loss pattern of the communication link by being configured to choose a packet loss pattern from a packet loss pattern table based on the current load and user scenario, wherein the packet loss pattern table comprises a list of packet loss patterns for the communication link with different load situations and different user scenarios.

The BPU 800 may be configured to obtain a packet loss pattern of the communication link by being configured to predict a packet loss pattern based on a trained packet loss prediction coefficient β and the current load situation and user scenario of the communication link.

The BPU 800 may further be configured to machine train the packet loss pattern model 806 to obtain a packet loss pattern prediction coefficient β based on packet loss patterns generated by the radio processing unit and a database comprising different load situations and user scenarios of the communication link.

The BPU 800 according to the embodiments herein for segmenting data to be transferred into data packets and transferring data packets via a communication link to a RPU may be implemented in a network node 100 as shown in FIG. 1 in a radio access network.

To summarize, the embodiments herein provide a method for data segmentation and data packet transfer between two units, e.g. from BPU to RPU, via a communication link. The data segmentation is based on the characteristic of the communication link, i.e. the packet loss pattern for different load situations and user scenarios. With this method, beamforming weights data for different major beams are distributed to different data packets so losing important data is avoided with the help of packet loss prediction. SU and MU MIMO performance and beamforming performance are improved due to reduced number of packet loss for all major beams by protecting important beamforming weights data from packet loss.

Those skilled in the art will appreciate that the data sorter 801, data selector 802, data segmentation 803, packet dispatcher 804, predictor 805, training model 806 etc. function blocks in the BPU 800 described above may be referred to one unit, a combination of analog and digital circuits, one or more processors, such as processor 810 configured with software and/or firmware and/or any other digital hardware performing the function of each unit.

The embodiments herein may be implemented through one or more processors, such as the processor 810 in the BPU 800 together with computer program code for performing the functions and actions of the embodiments herein. The program code mentioned above may also be provided as a computer program product, for instance in the form of a data carrier carrying computer program code for performing the embodiments herein when being loaded into the BPU 800. The computer program code may furthermore be provided as pure program code on a server or cloud and downloaded to the BPU 800.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a baseband processing unit (BPU) for segmenting data to be transferred into data packets and transferring data packets to a radio processing unit via a communication link, the method comprising:
    obtaining power level per beam for beamforming weights data;
    sorting the beamforming weights data based on at least the beam power;
    based at least on beam power level, selecting a certain amount of the beamforming weights data among the data to be transferred;
    obtaining a packet loss pattern of the communication link based on the current load and user scenario;
    segmenting the data to be transferred into data packets based on the packet loss pattern of the communication link such that the selected beamforming weights data are distributed to data packets to be transferred in a packet region where packet loss rate is lower than a packet loss threshold; and
    transferring the data packets to the radio processing unit.

2. The method according to claim 1, further comprising sorting user data based on quality of service (QOS) of UEs.

3. The method according to claim 2, wherein selecting the certain amount of data among the data to be transferred comprises selecting a certain amount of user data based on the QoS of the UEs.

4. The method according to claim 1, wherein sorting the beamforming weights data based on beam power level comprises listing the beamforming weights data in an order of higher power level to lower power level.

5. The method according to claim 4, where selecting a certain amount of beamforming weights data among the data to be transferred comprises selecting a certain amount of the data based on the listing of the beamforming weights data in the order of higher power level to lower power level.

6. The method according to claim 4, where segmenting the data to be transferred based on the packet loss pattern of the communication link comprises segmenting the data to be transferred such that the sorted data from the top to the bottom in the list are distributed to the data packets to be transferred in the packet regions with packet loss rate from lower to higher.

7. The method according to claim 1, wherein obtaining a packet loss pattern of the communication link comprises choosing a packet loss pattern from a packet loss pattern table based on the current load and user scenario, wherein the packet loss pattern table comprises a list of packet loss patterns for the communication link with different load situations and different user scenarios.

8. The method according to claim 1, wherein obtaining a packet loss pattern of the communication link comprises predicting a packet loss pattern based on a trained packet loss prediction coefficient β and the current load situation and user scenario of the communication link, wherein the trained packet loss prediction coefficient β is a number greater than zero.

9. The method according to claim 8 further comprising machine training a packet loss pattern model to obtain the packet loss pattern prediction coefficient β based on packet loss patterns generated by the radio processing unit and a database comprising different load situations and user scenarios of the communication link.

10. The method according to claim 9, wherein the packet loss pattern is generated by the radio processing unit for a communication link by:
    receiving from the BPU a number N of data packets during a time period T;
    determining that a packet is lost if an expected packet is not received within a predefined time limit Td; and
    generating a packet loss pattern for the communication link indicating positions of the lost packets either in time frame or in a sequence within the number N of data packets, and
    wherein N, T, and Td are each numbers greater than zero.

11. A network node comprising a baseband processing unit (BPU) for segmenting data to be transferred into data packets and transferring data packets to a radio processing unit via a communication link, the comprising:
    a memory:
    a processor in communication with the memory, the processor configured to:
        obtain power level per beam for beamforming weights data;
        sort the beamforming weights data based on at least the beam power;
        based at least on beam power level, select a certain amount of the beamforming weights data among the data to be transferred;
        obtain a packet loss pattern of the communication link based on the current load and user scenario;
        segment the data to be transferred into data packets based on the packet loss pattern of the communication link such that the selected beamforming weights data are distributed to data packets to be transferred in a packet region where packet loss rate is lower than a packet loss threshold; and
        transfer the data packets to the radio processing unit.

12. The BPU according to claim 11 is further configured to sort user data based on quality of service (QoS) of UEs.

13. The BPU according to claim 12 is configured to select the certain amount of user data based on the QoS of the UEs.

14. The BPU according to claim 11 wherein sorting the beamforming weights data based on beam power level comprises listing the beamforming weights data higher power level to lower power level.

15. The BPU according to claim 14 is configured to select a certain amount of beamforming weights data among the data to be transferred based on the listing of the beamforming weights data in the order of higher power level to lower power level.

* * * * *